Figure 1:
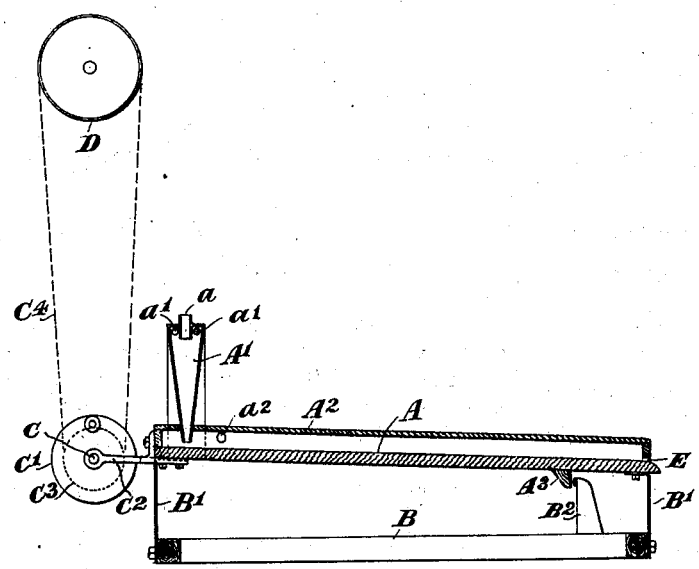

No. 750,034. PATENTED JAN. 19, 1904.
W. JAMIESON & F. J. ODLING.
PROCESS OF SEPARATING ZINC BLENDE FROM ORES.
APPLICATION FILED JUNE 2, 1903.
NO MODEL.

WITNESSES
INVENTORS
William Jamieson
Francis James Odling
BY
ATTORNEYS

No. 750,034. Patented January 19, 1904.

UNITED STATES PATENT OFFICE.

WILLIAM JAMIESON AND FRANCIS JAMES ODLING, OF MELBOURNE, VICTORIA, AUSTRALIA.

PROCESS OF SEPARATING ZINC-BLENDE FROM ORES.

SPECIFICATION forming part of Letters Patent No. 750,034, dated January 19, 1904.

Application filed June 2, 1903. Serial No. 159,816. (No specimens.)

*To all whom it may concern:*

Be it known that we, WILLIAM JAMIESON, gentleman, residing at Broken Hill Chambers, No. 31 Queen street, and FRANCIS JAMES ODLING, mining engineer, residing at No. 2 Princes Walk, Princes Bridge, Melbourne, in the State of Victoria, Commonwealth of Australia, subjects of the King of Great Britain and Ireland, have invented a new and useful Improved Process for the Separation of Zinc-Blende from Ores with Which It is Associated, of which the following is a specification.

This invention consists of an improved process for the separation of zinc-blende from ores with which it is associated. The ore to be treated must be in such a pulverized condition as to sufficiently free or liberate the particles of the different ores and gangue from one another and may be either crude ore, concentrates, tailings, or slimes.

The pulverized or crushed ore in a sufficiently wet condition is submitted to the action of chlorin (which may be in the form of gas or of a solution or of an easily-decomposed chlorin compound, the gas, solution, or compound being used separately or together, as may be most convenient) in such a way as to expose as fully as possible each particle of ore to the action of the chlorin, which action is hereinafter described, the quantity of chlorin used and time of exposure to chemical action being regulated according to the nature of the ore and the separation required. A temperature above normal is not required, although a slight increase in temperature makes the action more rapid in some ores. In ores containing galena it may be advisable to add a sufficient quantity of a soluble sulfate—such as sulfate of zinc, soda, &c.—to prevent undue action of the chlorin upon the galena. The action of the chlorin on the particles of zinc-blende associated with the ore being treated is such that when they are subjected to a vanning motion they tend to adhere to each other, forming small masses which become readily separable by mechanical means from the other particles of ore and gangue. The chlorin may be obtained by any well-known method or by electrolysis of the zinc chlorid formed during the action. The electrolysis may be carried on either in separate apparatus on in the same machine in which the chemical action takes place, the zinc being deposited on the cathode and the chlorin formed at the anode being utilized for the treatment of fresh quantities of the ore.

As an example of the working of the process, an ore containing, say, galena and zinc-blende which has been reduced sufficiently fine to liberate the different particles of ore and gangue are fed wet into a hopper or other suitable vessel having an agitating motion imparted to it and from thence passed onto a table having a vanning motion, or the table may be in the form of a traveling belt, with or without the above-mentioned motions, set at such an angle and of such a length as to allow the particles of zinc-blende to be acted upon, as hereinbefore described. A saturated solution of chlorin or one which has been found by trial to be sufficiently strong may be introduced through the sides or bottom of the hopper and at suitable positions on the table or belt, the hopper and table being securely covered, so that any chlorin escaping may be utilized or saved.

We are aware that it is not new to employ chlorin for the purpose of dissolving metals contained in ores by forming soluble chlorids; but we do not employ the chlorin for that purpose, it being used by us only to attack the surface of the particles of zinc-blende in order that they may afterward be readily and mechanically separated from the rest of the ore and gangue.

We are also aware that small quantities of soluble metallic chlorids are formed (incidentally or as by-products) in our process; but these soluble chlorids are not the object of our process and will be lost in the solution unless recovered by some special method, such as by precipitation or electrolysis.

In the accompanying drawings an apparatus or table suitable for the above-described process is illustrated.

Figure 2:
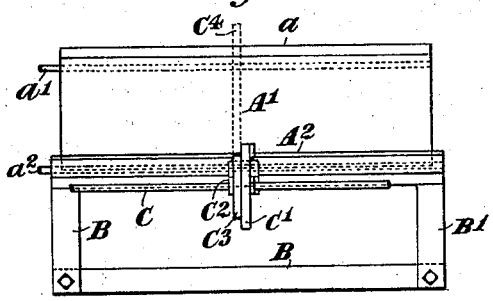

Figure 1 is a central longitudinal view, and Fig. 2 is an end elevation of same, while Fig.

3 is a view showing a table of the endless traveling belt type.

In Figs. 1 and 2, A is a flat inclined table to which a vanning or percussive motion is given, the table being carried above a bed-plate or under frame B by spring-supports B'. A' is a feed-hopper, and $A^2$ the covering or casing above the table. $a$ is the feed-opening for the material under treatment, and $a'$ and $a^2$ the pipes through which the chlorin gas is fed to within the hopper and into the area above the table. C is a suitably-supported lay-shaft having upon it a weighted or percussive disk C', and said shaft is attached by a rod $C^2$ with the end of table. $B^2$ is a buffer secured to frame B, and $A^3$ a buffer on under side of table to strike against the fixed buffer $B^2$. The weighted disk C' has a pulley $C^3$ at its side, which is driven by belt $C^4$ from a pulley D on an overhead shaft. E is the outlet-passage at delivery end of table.

Figure 3:
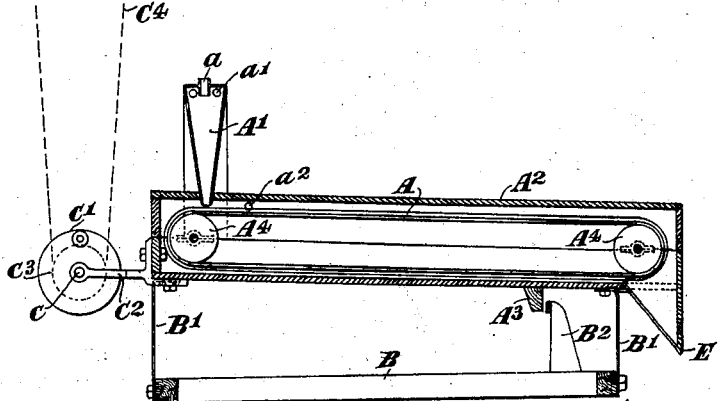

In Fig. 3 the table A is in the form of an endless traveling belt supported on rollers $A^4$, the other parts marked being similar to those already described with reference to the other figure.

Having now described our invention, what we claim as new, and desire to secure by Letters Patent, is—

1. In our process for the separation of zinc-blende from ore with which it is associated, treating the ore in a pulverized state and sufficiently wet condition with chlorin, for the purpose of attacking the surface of the zinc-blende and submitting the ore so treated to a vanning motion substantially as herein described.

2. In our process for the separation of zinc-blende from ore with which it is associated, treating the ore when in a sufficiently wet and pulverized condition with chlorin, in order to attack the surface of the zinc-blende and submitting the ore so treated to a vanning motion sufficient to bring the zinc-blende particles together and allow them to adhere to each other forming small masses so as to be easily separable by mechanical means from the rest of the ore and gangue substantially as herein described.

3. Our process for the separation of zinc-blende from ore with which it is associated consisting in first submitting the pulverized ore in a sufficiently wet condition to the action of chlorin, in order to attack the surface of the zinc-blende, vanning the treated ore sufficient to bring about the formation of the zinc-blende masses and then separating them from the rest of the ore and gangue substantially as herein described.

In witness whereof we have hereunto set our hands in presence of two witnesses.

WILLIAM JAMIESON.
FRANCIS JAMES ODLING.

Witnesses:
BEDLINGTON WODKOURT,
W. J. S. THOMPSON.